April 26, 1938. K. C. D. HICKMAN Re. 20,705
VACUUM EXTRACTION OF OILS CONTAINING THERAPEUTIC VALUES
Original Filed Dec. 23, 1930
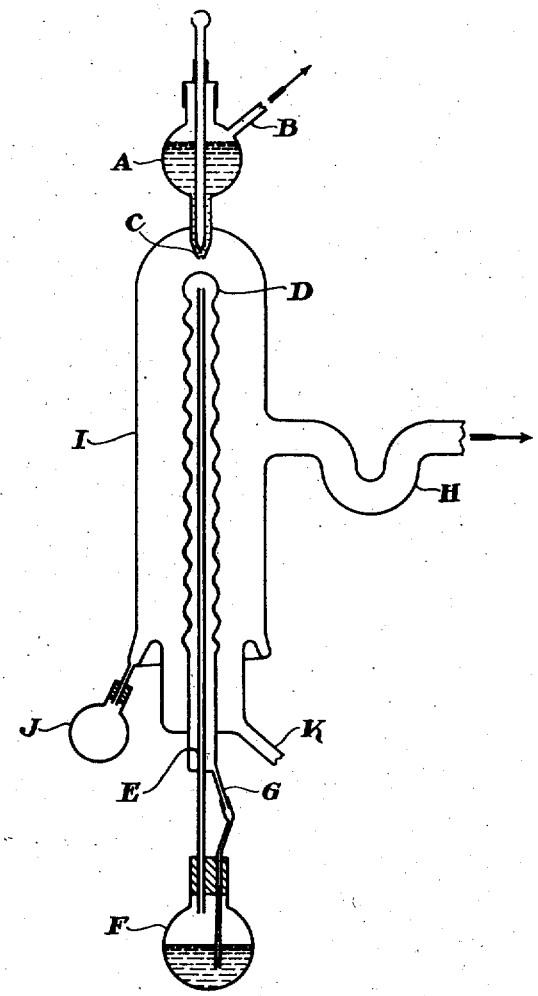
Inventor,
Kenneth C. D. Hickman,
By Arthur M. Pennie
Daniel J. Mayne
Attorneys Reissued Apr. 26, 1938 Re. 20,705

UNITED STATES PATENT OFFICE 20,705

VACUUM EXTRACTION OF OILS CONTAINING THERAPEUTIC VALUES

Kenneth C. D. Hickman, Rochester, N. Y., assignor, by mesne assignments, to Eastman Kodak Company, Rochester, N. Y., a corporation of New Jersey Original No. 1,925,559, dated September 5, 1933, Serial No. 504,305, December 23, 1930. Application for reissue March 6, 1934, Serial No. 714,351

5 Claims. (Cl. 167—81)

This invention relates to a novel process for the extraction of oils containing therapeutic values, such as fish liver oils, particularly cod liver oil, and the products resulting therefrom. It has been known for a long time that cod liver oil has valuable therapeutic properties due to its large content of vitamines, but owing to its disagreeable fishy taste and smell, the taking of this oil has been repugnant to many individuals. Many attempts have been made to remedy this defect of fishy odor with some success, but even with this improvement it is necessary for the individual to take the oil to get the vitamines. Oil, as is well known, has a decidedly detrimental effect on weak digestive systems and in some cases even tastelesss, odorless oil is not satisfactory.

By my invention most of the vitamine content is concentrated in a much smaller amount of foreign material than was formerly the case. The principle of my process is analogous to the well known practice of the drug trade of isolating the pure compound from the material in which it is present. In this way the impurities in the crude drug which might have a detrimental physiological action are eliminated. Although I have not isolated the vitamines I have reduced the amount of foreign materials in which they are contained until this becomes a negligible factor and offers no disadvantages in its administration to the individual.

My process preferably comprises the sudden heating of a thin layer of the oil undergoing treatment, such, for instance, as a cod liver oil layer less than .2 inch thick (about .01 inch thick is used in practice) to 100–200° C. but preferably to about 160° and subjecting it at the same time to a very high vacuum. As a result an oily fraction possessing valuable therapeutic properties sublimes from the oil and may be condensed on a nearby cold surface. It is desirable that the hot layer of oil and the cold surface shall be within one inch or less from each other. It is also desirable that the oil be maintained at a high temperature only for a short time, so that the residual oils may be used for therapeutic purposes.

This process is evaporative distillation. Evaporative distillation takes place more slowly than ordinary distillation, unless certain conditions are fulfilled which have long been recognized by scientific workers. The conditions involve (*a*) keeping the evaporative and condensing surfaces near one another, (*b*) providing a pressure of residual uncondensible gas, generally air, so low that no substantial interruption is caused to the stream of the molecules passing between the surfaces. Distillation is made more rapid when there is no molecular obstruction between the evaporative and condensing surfaces and I prefer to make these surfaces as near together as possible, preferably within the molecular free path of the gases present in the distillation chamber. Thus, when it is convenient for the gases to have a pressure of less than .001 mm. mercury, it is well to have the surfaces within one or two inches of each other; with a gas pressure .0001 mm. of mercury, surfaces may be 10 times this distance and so pro rata.

The distillate from this process was found to be exceptionally rich in growth promoting constituents which is of decided advantage for reasons previously pointed out. The distillate is purified by cooling or straining it from the inert wax which distills at the same time as the therapeutic substances. The wax has no detrimental effect but is merely present with the oil as an impurity and consequently it is desirable, although not absolutely necessary that it be removed. The product after the wax is removed is a yellow oil which may be administered in much smaller quantities than the original oil but with equal therapeutic effect. Further, since I am not able to distill all the vital substances from the oil by vacuum treatment the residual oil retains some therapeutic properties. This oil is found to have lost all of its fishy taste and most of its fishy odor and is therefore a valuable medicinal agent.

In the accompanying diagram is shown an apparatus which may be used in my process. It consists of a heated column closely adjacent to an enclosed cooled surface, the head of the vertical heated column being under a source of liquid supply. In the apparatus illustrated a reservoir A contains the cod liver oil or other liquid to be treated. It is preferred that the liquid be degassed, which is done by a degassing pump (not shown) attached to pipe B. Any type of evacuating pump desired may be used for degassing. The oil is allowed to drop from the reservoir A onto the glass dome D by means of a suitable valve C. A needle valve is shown in use in the illustration. The glass column or dome D has a glass coil wound about the outside to spread the oil evenly over the surface in a thin layer. In the dome D is a tube E supplying vapor from the boiler F which warms the dome to the desired temperature. Electrical heating means or other heating means that can be regulated can be substituted for that shown. With the heating means shown the vapor condenses within the dome and is returned to the boiler through pipe G. The dome is surrounded by a cylindrical chamber I, the walls of which are an inch or less from the column. If desired, the walls of this chamber may be artificially cooled, e. g., by cooling coils. The chamber I is completely enclosed so that it may be evacuated. To it is attached a pipe H containing a trap leading to a condensation and evacuating pump. The trap is preferably cooled artificially to condense any vapors passing through. A flask J is attached to the chamber in the manner shown to collect condensation from the sides of the chamber I. The spent oil collects at the bottom of the chamber I and is run off through passage K. It is, of course, apparent that a suitable valve would be necessary at the end of pipe K to retain needed pressure in the chamber.

As the process is carried out the oil is dropped on the dome or column D, which sublimes the waxy substances from the oil. This collects on the cool walls of the chamber I, falls to the trough portion of the chamber where it is collected in flask J.

It is understood that the process is described on a pharmaceutical scale and various modifications are possible in case a larger production is desired. The apparatus described in my application Serial No. 504,306, filed December 23, 1930, is of the type which is within the contemplation of my invention for carrying out my process.

The products of this process were tested in the usual manner of testing materials for the content of growth promoting constituents, namely by feeding the same to white mice. It was found that this waxy distillate or product could be used in minute quantities and still promote normal growth, although used with foods that were deficient in growth promoting materials. Every indication points to a large content of vitamines, especially A and D. However, it is to be understood that this belief is based upon theory and is not to limit my invention. It is presumed that vitamines are present because of the physiological action of this material. The temperatures described were determined with a copper-constantan thermocouple, the twisted junction of which was allowed to rest in a thin stream of the oil passing down the evaporating surface. The twisted junction was in contact with the column and sloped slightly downwardly. It was located at approximately the central portion of the column.

The term "high vacuum" as employed herein is to be understood to mean that pressure which is low enough to give a mean free path of greater than .001 inch. In practical commercial operations a pressure of less than .1 mm. is employed and preferably less than .01 mm. pressure in order that the condensing surface will not be too close to the oil surface for practical operation. It is also a feature of this type of distillation, as pointed out in my application Serial No. 504,306, filed December 23, 1930, that the higher the vacuum (or in other words, the more reduced the pressure) the greater may be the permissible distance of the condensing surface from the surface of the oil which is being heated, the pressures and distances referred to being inversely proportional to each other. In practice, due to the difficulty of maintaining the extremely high vacuums, even though they may give better results, it is preferred that the distillation be carried on at a pressure at which the condensing surface is not more than 1 inch from the surface of the liquid being evaporated.

What I now claim as my invention and desire to secure by Letters Patent of the United States is the following:

1. A process of extracting a cod liver oil which comprises heating a thin film of the oil at 100 to 200° C. in a high vacuum and condensing the vapor given off at a point 1–.001 inch from the film.

2. A process of extracting a fish oil containing vitamins which comprises heating a thin film of the oil at 100 to 200° C. at a pressure below about .01 mm. and condensing the vapor given off at a point 1–.001 inch from the film.

3. A process of extracting a fish liver oil containing vitamins which comprises heating a thin film of the oil at 100 to 200° C. in a high vacuum and condensing the vapor given off at a point 1–.001 inch from the film.

4. A process of extracting therapeutic elements from cod liver oil which comprises heating a thin film of the oil at a temperature of 100°–200° C. and a pressure of less than .01 mm. of mercury and condensing the vapor given off at a point 1–.001 inch from the film.

5. A process of extracting a fat soluble vitamin from a fish liver oil which comprises heating a thin film of the oil at 100° to 200° C. at a pressure below about .01 mm. and condensing the vapors given off at a point about 1–.001 inch from the film.

KENNETH C. D. HICKMAN.